(12) United States Patent
Cado

(10) Patent No.: US 8,379,195 B2
(45) Date of Patent: Feb. 19, 2013

(54) VISUALIZATION OF THE ULTRAVIOLET RADIATION REFLECTING POWER OF A SPECTACLE LENS

(75) Inventor: Herve Cado, Charenton le Pont (FR)

(73) Assignee: Essilor International (compagnie Generale D'optiqe), Charenton le Pont (FR)

( * ) Notice: Subject to any disclaimer, the term of this patent is extended or adjusted under 35 U.S.C. 154(b) by 203 days.

(21) Appl. No.: 12/446,359

(22) PCT Filed: Oct. 16, 2007

(86) PCT No.: PCT/FR2007/052174
§ 371 (c)(1), (2), (4) Date: Aug. 6, 2009

(87) PCT Pub. No.: WO2008/047045
PCT Pub. Date: Apr. 24, 2008

(65) Prior Publication Data
US 2010/0007873 A1    Jan. 14, 2010

(30) Foreign Application Priority Data
Oct. 18, 2006   (FR) .................................... 06 09137

(51) Int. Cl.
*G01B 9/00* (2006.01)

(52) U.S. Cl. ......... 356/124; 434/271; 434/356; 434/367

(58) Field of Classification Search .................. 356/124; 434/271, 356–367
See application file for complete search history.

(56) References Cited

U.S. PATENT DOCUMENTS

| | | | |
|---|---|---|---|
| 3,773,420 A | 11/1973 | Conroy | |
| 4,213,701 A * | 7/1980 | Lanzilloti | ...................... 356/124 |
| 4,505,683 A * | 3/1985 | Schurle et al. | ................. 434/365 |
| 4,764,007 A * | 8/1988 | Task | .............................. 351/243 |
| 4,916,319 A | 4/1990 | Telfair et al. | |
| 6,099,126 A * | 8/2000 | Teskey | ........................... 351/213 |
| 6,113,238 A * | 9/2000 | Balch et al. | .................... 351/232 |
| 6,808,394 B1 * | 10/2004 | Bentley | ........................... 434/365 |
| 7,295,293 B2 * | 11/2007 | Gupta et al. | ................... 356/124 |
| 2004/0145729 A1 | 7/2004 | Verfel | |

FOREIGN PATENT DOCUMENTS

EP   0094440   11/1983

* cited by examiner

*Primary Examiner* — Tarifur Chowdhury
*Assistant Examiner* — Isiaka Akanbi
(74) *Attorney, Agent, or Firm* — Occhiuti Rohlicek & Tsao LLP

(57) ABSTRACT

According to the invention, in order to visualize the ultraviolet radiation reflection power of a glasses lens (10), a face of said lens is exposed to an ultraviolet radiation in order to reflect a portion of said radiation. The portion of the reflected radiation then activates a developer surface (3) having a visual appearance that changes under the influence of the received ultraviolet radiation. The developer surface is watched in real time by an observer (100). Such a visualization is particularly quick, simple and demonstrative, and can be used in an optician's shop to help a client chose a glasses lens.

13 Claims, 1 Drawing Sheet

VISUALIZATION OF THE ULTRAVIOLET RADIATION REFLECTING POWER OF A SPECTACLE LENS

CROSS-REFERENCE TO RELATED APPLICATIONS

Figure 1:
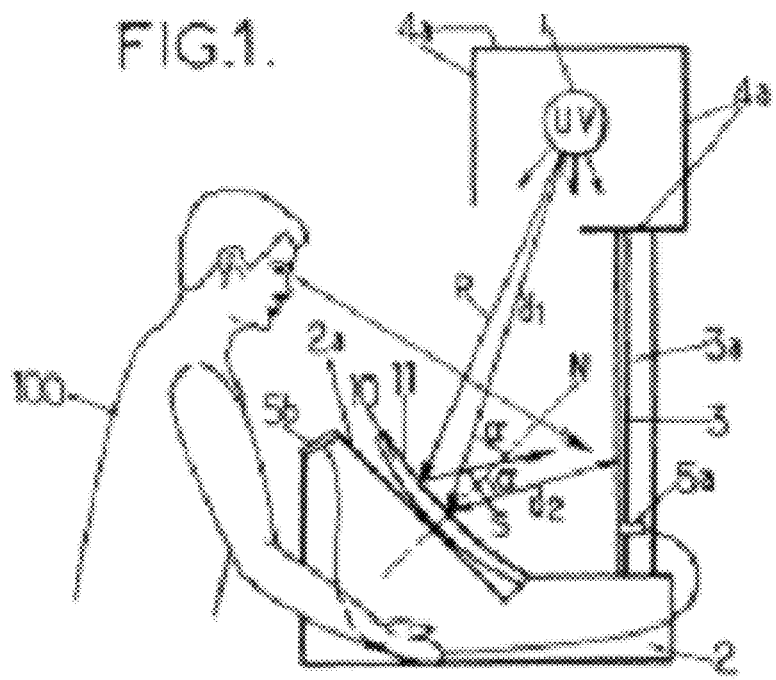

This application is the National Stage of International Application No. PCT/FR2007/052174, filed Oct. 16, 2007, which claims priority to French Application No. 0609137, filed Oct. 18, 2006. The contents of both applications are hereby incorporated by reference in their entirety.

The present invention relates to a method and a device for the visualization of the ultraviolet (UV) radiation reflecting power of a spectacle lens. The method and the device are capable, in particular, of visualizing such a reflectivity when a coating covers a back face of the lens.

It is acknowledged that UV light of solar or artificial origin is harmful to the human eye. For this reason, there are pairs of spectacles which protect the eyes against UV rays originating from sources situated in the field of view of a wearer of these spectacles. In particular, many pairs of spectacles for protection against sunlight, called sunglasses, provide filtering of the UV radiation transmitted as well as a partial absorption of visible light. Hereafter, by "visible light" is meant light having a wavelength within the band comprised between 380 nm and 780 nm (nanometers).

For such sunglasses, it is possible to provide anti-glare coatings in respect of the visible light on the back face of the lenses. Such coatings reduce the dazzle and visual discomfort caused by light sources situated behind the spectacle wearer producing reflections on the back faces of the lenses in the external lateral parts of the latter.

However, an anti-glare coating in respect of the visible light often has the property of increasing the reflection of a UV radiation corresponding to wavelengths situated in the band 320 nm-380 nm. The effectiveness of eye protection against the harmful effects of UV radiation is then reduced.

It is thus necessary to compare the abilities of back face coatings of spectacle lenses, sunglasses or otherwise, to reflect a UV radiation to a small extent. There are optical measurement instruments for this purpose, of the UV spectrophotometer or UV radiometer type for example, but they are bulky, are lengthy and complex to use, and do not give a helpful illustration for a prospective spectacle-lens wearer. In fact, the results of the measurements they provide are abstract and unintelligible to a client who is not a specialist in optics.

A purpose of the present invention is therefore to provide a method of visualizing the UV radiation reflecting power of a spectacle lens, which does not have the drawbacks mentioned above and which can be used with ease at the optician.

To this end, the invention proposes a method of visualizing the ultraviolet radiation reflecting power of a spectacle lens, comprising:

exposing a face of the lens to a primary ultraviolet radiation, so that a secondary ultraviolet radiation is produced by reflection of the primary ultraviolet radiation on the face of the lens;

obtaining a developing surface having a visual appearance which varies according to the intensity of ultraviolet radiation which it receives; and arranging the developing surface in the secondary ultraviolet radiation in such a way as to be visible to an observer.

Thus, in a method according to the invention, the developing surface converts the intensity of the ultraviolet radiation which is reflected by the spectacle lens into a visible light intensity discernable to the naked eye. The method therefore allows the observer to rapidly judge for himself, in a direct and conclusive manner, the intensity of the UV radiation which is reflected by the spectacle lens. Such a method is thus particularly suitable for guiding the choice of a prospective spectacle lens wearer at the optician, when reflection of UV radiation is one of the criteria for selecting lenses.

The method can be implemented so that the face of the spectacle lens which is exposed to the primary ultraviolet radiation is a back face, with respect to a use of the lens when assembled in a spectacle frame. It thus makes it possible to assess the quantity of UV radiation to which the eye would be exposed by reflection on the back face of the lens in the external lateral parts of the latter.

According to various particular embodiments of the invention, the developing surface can incorporate at least one optical brightener or a photochromic material. Such developing surfaces are simple, inexpensive items which can be easily used, in particular without an electricity supply. In the case where the developing surface incorporates one or more optical brighteners, it can comprise a paper surface, preferably white.

The invention also proposes a device for visualizing the ultraviolet radiation reflecting power of a spectacle lens which comprises:

a source of ultraviolet radiation;

a support which is capable of supporting a spectacle lens in a primary ultraviolet radiation originating from the source, in order to produce a secondary ultraviolet radiation by reflection of the primary ultraviolet radiation on a face of the spectacle lens; and a developing surface which can be viewed by an observer, and which is arranged in a field of reflection of the primary ultraviolet radiation by the spectacle lens, so as to receive the secondary ultraviolet radiation; the developing surface being selected in order to present a visual appearance which varies according to the intensity of ultraviolet radiation that it receives.

Such a visualization device is particularly simple and can have a small space requirement. For this reason, it is particularly suitable for use in an optician's shop, in order to allow a client to choose a suitable spectacle lens according to the UV radiation protection that he requires.

Figure 2:
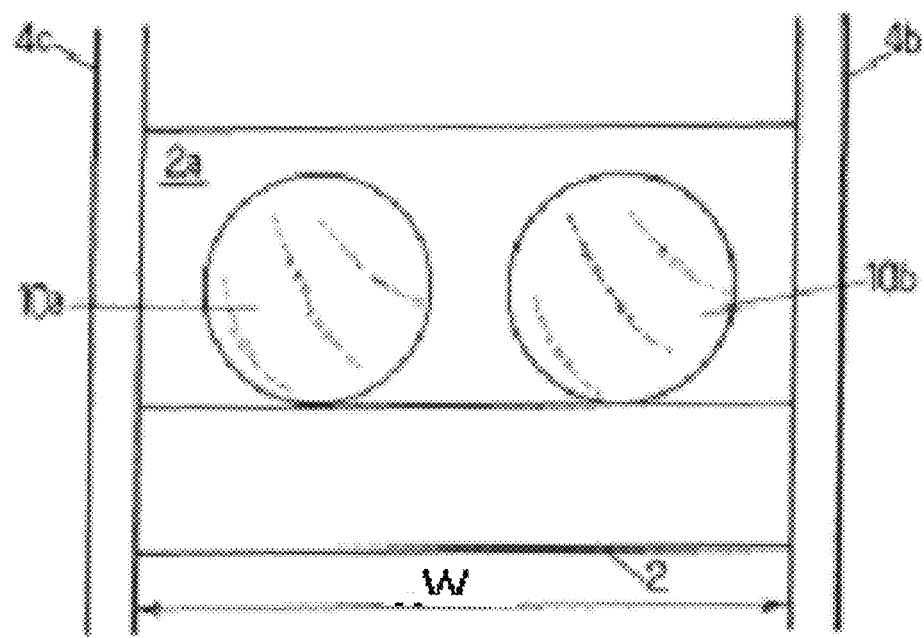

Other features and advantages of the present invention will become apparent from the following description of a non-limitative embodiment, with reference to the attached drawings in which:

FIG. 1 is a side view showing the principle of visualizing the ultraviolet radiation reflecting power of a spectacle lens using a method according to the invention; and FIG. 2 shows a support suitable for comparison of the reflecting powers of two spectacle lenses.

In these figures, for reasons of clarity, the dimensions of the different elements represented are not in proportion to actual dimensions and dimensional relationships.

According to FIG. 1, a device for visualizing the ultraviolet radiation reflecting power of spectacle lenses comprises a source of UV radiation referenced 1, a base 2 serving to support the lenses, and a developing surface 3. The device is suitably dimensioned to be placed on a table or a counter, at a height for viewing by a user 100 in a seated position, for example. The base 2 constitutes the lower part of the device and the UV radiation source 1 is situated in an upper part of the device, above the base 2. The source 1 is oriented so as to produce a primary UV radiation, marked P, which is directed towards the base 2. The developing surface 3, which is intended for attentive viewing, constitutes an approximately vertical back to the device and is situated at an intermediate height between the base 2 and the source 1.

The source 1 is selected so as to produce a primary UV radiation P which is situated partially within a wavelength band extending from 320 nm (nanometers) to 380 nm. Many suitable UV sources are commercially available. In particular, sources having the form of elongated tubes are very suitable as they can produce a substantially uniform UV radiation over a width W of the device which can be greater than 25 cm. Optionally, several tubes of this type can be arranged parallel to each other, so as to produce a substantially uniform primary UV radiation over the whole of the surface where the spectacle lenses can be placed.

The base 2 has a support surface 2a capable of receiving one or more spectacle lenses for which it is desired to assess the UV reflecting power. The surface 2a is oriented at approximately 45 degrees in relation to a vertical direction and is exposed to the primary UV radiation produced by the source 1. It is advantageously covered with material having a high UV radiation absorption capability. In this way a high contrast is obtained on the developing surface 3, between a zone of this surface which receives a secondary UV radiation S produced by reflection of the primary UV radiation P on a lens 10 arranged on the surface 2a, and a zone of the developing surface 3 which is not opposite the lens 10. For example, the surface 2a can be covered with a piece of black baize. FIG. 2 is a top view of a base 2 which is capable of receiving two spectacle lenses 10a and 10b simultaneously on the surface 2a. To this end, the width W of the base 2 is greater than twice the diameter of a spectacle lens blank. It can be, for example, approximately equal to 25 cm.

The developing surface 3 has a width identical to that of the base 2. It can be constituted by a sheet of paper which contains optical brighteners. Such brighteners are compounds well known to a person skilled in the art, which emit a fluorescent visible light when they are illuminated by UV radiation. The visible light which is produced by these compounds is therefore situated at least partially within the wavelength band comprised between 380 nm and 780 nm, in particular between 380 nm and 420 nm, corresponding to a blue colour. Such optical brighteners are currently used in the paper industry to reinforce the impression of whiteness of the paper, and reference may be made to one of the numerous published articles concerning these compounds. By way of example, derivative compounds of 4,4'-diaminostilbene-2,2' disulphonic acid can be used to constitute the developing surface 3. Advantageously, the surface 3 can be constituted by a sheet of white paper, by means of which a halo of visible light produced by the optical brighteners can be clearly perceived.

According to another embodiment of the developing surface 3, the latter can constitute a layer of photochromic material arranged in front of a light-coloured background referenced 3a in FIG. 1. In a known manner, a photochromic material has the property of becoming absorbent when it receives UV radiation. It can be in the form of a colorant or pigment incorporated into the surface 3. The developing surface 3 thus constituted darkens at the place where it receives UV radiation. Optionally, several photochromic material components can be selected and mixed to give the developing surface 3 a shaded tint, in the presence of UV radiation, corresponding to an improved visual sensitivity for a user of the device.

The optical brightener(s) or the photochromic material which is incorporated into the developing surface 3 is selected so that this surface 3 is sensitive to UV radiation situated within the band 320 nm-380 nm, corresponding to the spectral band of the emission of the source 1.

In a particularly compact embodiment of the device, which achieves satisfactory comfort in use, a distance $d_1$ comprised between 10 cm and 50 cm separates the source 1 and the support surface 2a. A distance $d_2$ comprised between 5 cm and 20 cm also separates the support surface 2a and the developing surface 3. Moreover, the support surface 2a and the developing surface 3 are arranged so that an angle of incidence α of the primary UV radiation P is comprised between 30 and 45 degrees to a direction N perpendicular to the support surface 2a. The same features of the geometrical arrangement are approximately replicated with respect to the lens 10, given that the latter is placed on the support surface 2a in a position in which it is approximately parallel thereto.

The surface 2a of the base 2 is inclined in the direction of the developing surface 3, facing the observer 100. In this way, a secondary UV radiation S which is produced by reflection, on a lens 10 placed on the surface 2a, of the primary UV radiation P is directed toward the surface 3. The lens 10 rests on the surface 2a by its face opposite to that which is exposed to the primary UV radiation P. Given that the support surface 2a absorbs the UV radiation in the zones of the latter which are not covered by the lens 10, the activation of the developing surface 3 corresponds exclusively to the reflection of the primary UV radiation P on the face of the lens 10 opposite the surface 2a. In this way, the secondary UV radiation S activates the developing surface 3 approximately proportionally to the intensity of this secondary radiation S. When the surface 3 contains optical brighteners, a light halo viewed by the observer 100 appears on the latter, in line with the lens 10 which originally reflects the primary UV radiation P. If the surface 3 contains a photochromic material, a dark mark appears at the same place. Optionally, it can be advantageous to have absorbent screens 4b and 4c arranged at the sides of the developing surface 3, to reduce or eliminate an illumination of the latter by an unwanted radiation other than the secondary UV radiation S. Similarly, the source 1 can be surrounded by screens 4a, in order to prevent the primary UV radiation P emerging in the direction of the observer 100 or directly reaching the developing surface 3.

Optionally, the device can comprise moreover an instrument for measuring the intensity of the secondary UV radiation S which is produced by reflection on the lens 10. Such a device makes it possible to associate a value quantifying the reflection of the UV radiation by the lens 10 with the qualitative perception of the intensity of this reflection judged by the observer 100. To this end, a UV radiation detector 5a, of the radiometer type for example, can be arranged at the level of the developing surface 3, and coupled to a display unit 5b arranged on a front part of the base 2, for displaying the result of the measurement.

When the method of the invention is used for visualizing the reflective power of a back face of a spectacle lens 10, the latter is placed on the surface 2a by its front face. The back face of the lens 10 is then exposed to the primary UV radiation P and the activation of the developing surface 3 corresponds to the intensity of the reflection of UV radiation from this back face. It is understood that the lens 10 can be of any type, in particular of the type of lens correcting ametropia or sunglasses lens, and can have any composition, in particular mineral, organic or a mixture.

Optionally, the face of the lens 10, the UV radiation reflecting power of which is being visualized, can be equipped with at least one functional coating 11. This functional coating 11 can comprise, in particular, a visible-light anti-glare coating. It can also comprise a shock-resistant coating, a scratch-resistant coating, a varnish, an antistatic coating, a dirt-resistant coating, etc., or a combination of these. A configuration of the device corresponding to FIG. 2 is then particularly advantageous, as it makes it possible to visualize comparatively and simultaneously the UV reflecting powers of the face of a spectacle lens which is provided with the functional coating 11 and a face of a reference lens, which can be without the functional coating. In FIG. 2, the references 10a and 10b denote respectively the lens provided with the functional coating 11 and the reference lens, which are arranged side by side on the surface 2a. The UV radiation source 1 is adapted so that the two lenses 10a and 10b can simultaneously receive substantially identical parts of the primary UV radiation P. Moreover, the developing surface 3 is capable of simultaneously displaying separate zones of the latter receiving distinct secondary UV radiations produced respectively by reflection of parts of the primary UV radiation P on the two lenses 10a and 10b. The observer 100 can then compare the halos which appear on the developing surface 3, in order to visualize the effect of the functional coating 11 on the UV radiation reflection in comparison with the reference lens 10b. In this way, it is possible to visually perceive the UV radiation reflecting powers conferred by coatings 11, varying from a few percent to more than 25% for example, and which can be distributed more or less uniformly over the band 320 nm-380 nm, or having reflection maxima. Such a visualization is particularly effective, rapid and conclusive.

Finally, of course it is possible to introduce many adaptations of the device and the visualization method described in detail above, while retaining at least some of the advantages of the invention.

The invention claimed is:

1. Method of visualizing the ultraviolet radiation reflecting power of a spectacle lens comprising:
    exposing a face of the lens to a primary ultraviolet radiation (P), so that a secondary ultraviolet radiation (S) is produced by reflection of said primary ultraviolet radiation on the face of the lens,
    said method being characterized in that it comprises moreover:
    obtaining a developing surface having a visual appearance which varies according to the intensity of ultraviolet radiation received by said surface;
    arranging the developing surface in the secondary ultraviolet radiation (S) in such a way as to be visible to an observer; and
    prior to the exposing step, placing the spectacle lens on an ultraviolet-radiation absorbent support, by a face of said lens opposite to the face exposed to the primary ultraviolet radiation (P).

2. Method according to claim 1, according to which the face of the spectacle lens exposed to the primary ultraviolet radiation (P) is a back face of the lens, with respect to a use of said lens assembled in a spectacles frame.

3. Method according to claim 1, according to which the developing surface incorporates at least one optical brightener.

4. Method according to claim 3, according to which the developing surface comprises a paper surface.

5. Method according to claim 1, according to which the developing surface incorporates a photochromic material.

6. Method according to claim 1, according to which the primary ultraviolet radiation (P) is situated at least partially within a wavelength band extending between 320 nm and 380 nm, and according to which the developing surface is sensitive to an ultraviolet radiation situated within said band.

7. Method according to claim 1, according to which a distance ($d_1$) between a source of the primary ultraviolet radiation (P) and the spectacle lens is comprised between 10 cm and 50 cm.

8. Method according to claim 1, according to which a distance ($d_2$) between the spectacle lens and the developing surface is comprised between 5 cm and 20 cm.

9. Method according to claim 1, according to which the spectacle lens and the developing surface are arranged so that an angle of incidence ($\alpha$) of the primary ultraviolet radiation (P) with respect to a direction (N) perpendicular to the face of the lens exposed to said primary radiation is comprised between 30 and 45 degrees.

10. Method according to claim 1, capable of simultaneously visualizing separate zones of the developing surface receiving distinct secondary ultraviolet radiations, said secondary ultraviolet radiations being produced respectively by reflection of parts of the primary ultraviolet radiation (P) on two spectacle lenses arranged side by side in the same manner in said primary ultraviolet radiation.

11. Method according to claim 10, according to which the ultraviolet radiation reflecting power of the face of the spectacle lens provided with the functional coating and an ultraviolet radiation reflecting power of the face of a reference lens are visualized comparatively.

12. Method according to claim 1, according to which the spectacle lens is provided with at least one functional coating.

13. Method according to claim 1, further comprising providing a source of the primary ultraviolet radiation (P) that produces a uniform ultraviolet radiation over the whole of the support.

* * * * *